United States Patent [19]

Weismann et al.

[11] Patent Number: 4,582,160

[45] Date of Patent: Apr. 15, 1986

[54] CONSTANT FOUR WHEEL DRIVE VEHICLE TRANSAXLE

[75] Inventors: Peter H. Weismann, Santa Ana, Calif.; Dugald Cameron, Grosse Pointe Woods, Mich.

[73] Assignee: Chrysler Corporation, Highland Park, Mich.

[21] Appl. No.: 736,159

[22] Filed: May 20, 1985

[51] Int. Cl.$^4$ .............................................. B60K 17/34
[52] U.S. Cl. ........................................ 180/250; 74/705
[58] Field of Search ...................... 180/248, 249, 250; 74/700, 701, 705, 665 GC, 665 GA, 695

[56] References Cited

U.S. PATENT DOCUMENTS

| | | | |
|---|---|---|---|
| 4,417,642 | 11/1983 | Suzuki | 180/249 |
| 4,457,394 | 7/1984 | Suzuki | 180/247 |
| 4,476,953 | 10/1984 | Hiraiwa | 180/249 |

Primary Examiner—John J. Love
Assistant Examiner—Everett G. Diederiks, Jr.
Attorney, Agent, or Firm—Edward P. Barthel

[57] ABSTRACT

A dual bevel gear differential transaxle assembly for a front transverse engine vehicle with front and rear pairs of road wheels providing a constant four wheel drive system. A first interaxle bevel gear differential and a second front wheel bevel gear differential are aligned on a transverse axis. The differentials are connected by a side gear shaft and inner and outer side gear sleeves concentric about the side gear shaft. The first differential achieves front axle to rear axle differentiation while the second differential provides differentiation for the front pair of road wheels. The dual differential transaxle assembly includes clutch means providing selective lock-out of the first differential. With the clutch means disengaged the first differential is in its unlocked mode whereby the transaxle assembly provides differentiation between the front and rear axles. Upon the clutch means being manually engaged the first differential is locked-up and there is no differentiation between the front and rear axles.

2 Claims, 3 Drawing Figures

CONSTANT FOUR WHEEL DRIVE VEHICLE TRANSAXLE

BACKGROUND OF THE INVENTION

This invention relates to a front wheel transaxle for a constant four-wheel drive vehicle and, more particularly, to a dual differential assembly for such a vehicle transaxle.

Constant four-wheel drive vehicle systems having a front wheel transaxle are known in the art. An example of one such system is disclosed in U.S. Pat. No. 4,417,642 issued to Suzuki et al. on Nov. 29, 1983. The Suzuki patent describes a four-wheel drive transaxle incorporating a front to rear interaxle bevel gear differential and a planetary gear differential with a clutch lockout mechanism. The U.S. Pat. No. 3,400,777 issued to C. Hill on Sept. 10, 1968 relates to a three differential four-wheel drive system with a lock-out clutch designed for a rear engine drive vehicle. The U.S. Pat. No. 4,476,953 issued to Hiraiwa on Oct. 16, 1984 for a Four-Wheel Vehicle Drive System discloses a transaxle mechanism with two connected bevel gear differentials. The system requires an intermediate gear mechanism gear shaft for transmitting driving power to the rear-wheel driveline.

SUMMARY OF THE INVENTION

In accordance with the present invention, a dual bevel gear differential assembly for a front wheel transaxle is adapted for installation in a vehicle providing a constant four-wheel drive system. The vehicle has a front mounted engine which extends transversely of the vehicle. A transmission, which also extends transversely of the vehicle, has its transverse input shaft drivingly connected to the crankshaft of the engine which is rotatable about an axis in a lateral or east-west direction of the vehicle. The transmission output shaft is parallel with its input shaft and is drivingly connected to the rotatable casing of a first front axle to rear axle or interaxle bevel gear differential. The interaxle differential has its case supported for rotation relative to the transaxle housing and provides differentiation between the front axle and the rear axle.

A second front-wheel to front-wheel bevel gear differential has its case rotatively supported within the transaxle housing. A first transverse side gear shaft has its outer end suitably connected to one front wheel drive shaft while its other end extends through the interaxle differential side gears and case for driven engagement with the inboard side gear of the front wheel differential. A second side gear shaft has its outer end suitably connected to the other front wheel drive shaft while its inner end is connected to the outboard side gear of the front wheel differential. An inner side gear sleeve surrounds the first side gear shaft and drivingly interconnects the interaxle differential outboard side gear with the rotatable casing of the front wheel differential.

An outer side gear sleeve surrounds the inner side gear sleeve and drivingly engages the interaxle front-to-rear differential inboard side gear to a crown or bevel gear mounted on the outer side gear sleeve. The crown gear is drivingly engaged with a mating cone gear on the front end of a longitudinal extending front axle to rear axle propeller shaft. A third rear axle differential is drivingly engaged by gear means on the rearward end of the propeller shaft.

Clutch means are provided to selectively transfer torque between the first bevel gear differential case and its outer side gear sleeve. With this arrangement the dual differential assembly provides a continuous four-wheel drive system with the interaxle bevel gear differential operative to differentially interconnect the front and rear differentials when the clutch means is disengaged. Upon the clutch means being engaged the assembly provides continuous four-wheel drive with the interaxle differential and rear axle differential in a lock-up condition.

A feature of this invention is to provide a dual bevel gear differential assembly for a front wheel-drive transaxle having a transversely aligned front engine.

Another feature of the invention is to incorporate a conventional vehicle front wheel drive transverse engine with a continuous four-wheel drive vehicle transaxle having a first interaxle bevel gear differential which is operative to split the drive torque into a first output component being transmitted through a second front wheel bevel gear differential to the pair of front road wheels and a rear axle differential to a pair of rear road wheels.

Still another feature of the invention is to provide a continuous four wheel drive transaxle assembly as set forth above which drivingly interconnects the first interaxle bevel gear differential with the second front wheel bevel gear differential by means of four concentrically arranged drive members adopted for relative rotation about a common transverse axis. The four concentric members include a first innermost side gear shaft, inner and outer side gear sleeves, and an outermost tubular extension of the interaxle differential casing. The interaxle first differential casing tubular extension in combination with the outer side gear sleeve support a compact lock-out clutch arrangement which when manually engaged obviates differentiation between the front and rear axles.

Another feature of this invention is to provide a transaxle assembly as set forth above wherein it is possible to accomplish front axle and rear axle ratio change merely by changing the helical final drive gears of the transaxle.

BRIEF DESCRIPTION OF THE DRAWINGS

These and other features and advantages of the invention will appear from the following written description and the accompanying drawings in which.

DETAILED DESCRIPTION OF THE INVENTION

Figure 1:
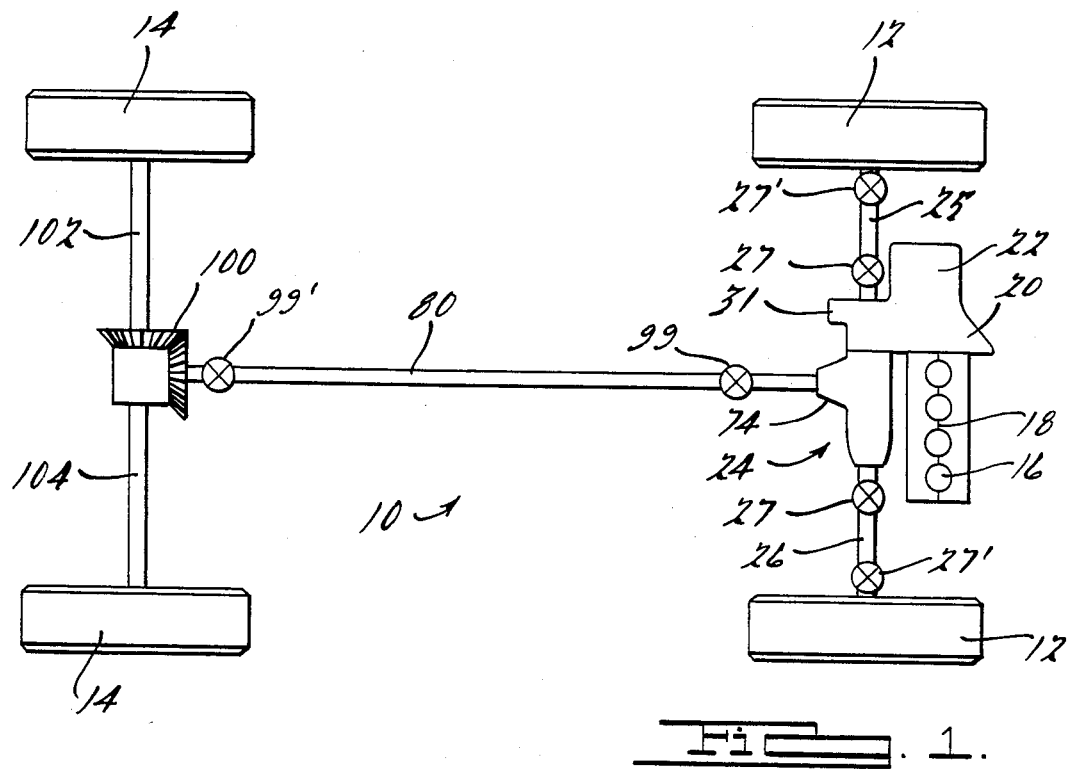
FIG. 1 is a schematic plan view of the arrangement of the constant four-wheel drive vehicle system incorporating the front transaxle assembly of the present invention.
Figure 2:
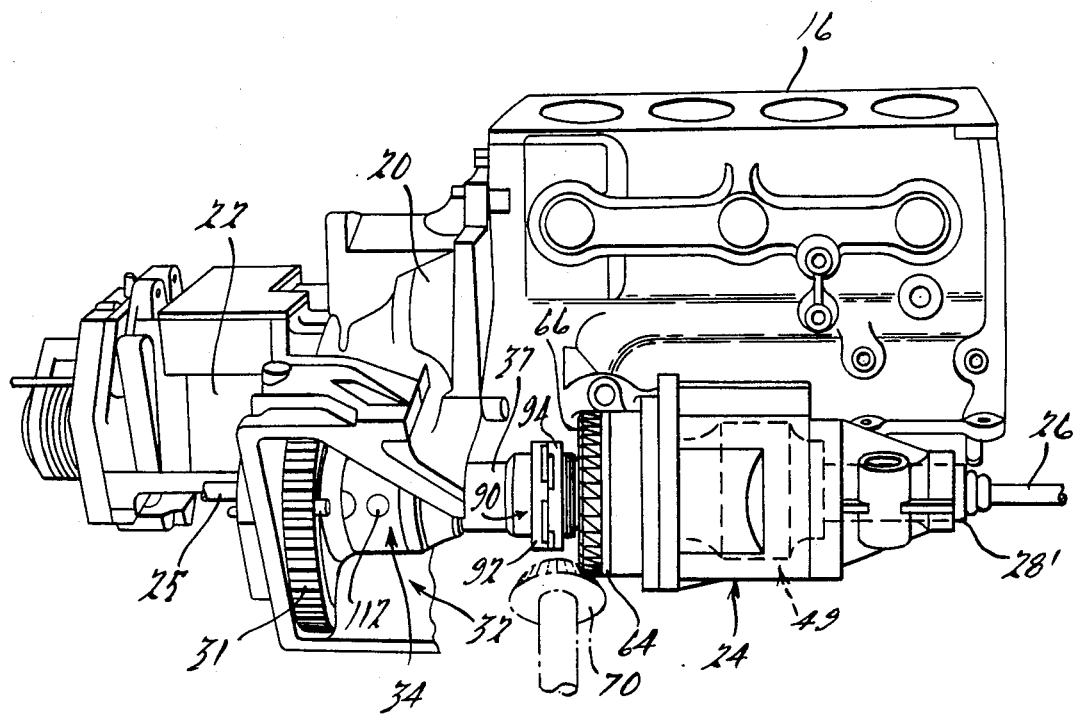
FIG. 2 is a fragmentary perspective view of the vehicle transverse engine and front transaxle with parts broken away.

FIG. 1 of the drawings diagrammatically discloses a layout of a motor vehicle drivetrain 10 with a transversely mounted front engine suited for use with the present invention. The vehicle has a pair of the front drive wheels 12 and a pair of rear drive wheels 14 with the front engine 16 positioned crosswise between the two front wheels 12.

As seen in FIG. 1 the engine 16 has a transversely extending crankshaft 18 with its left-hand end splined to a clutch (not shown) in shell 20. The clutch is selectively connectable to an input shaft (not shown) of a transversely aligned manual or automatic transaxle power transmission unit 22. The transmission includes a change speed gearbox with an output transfer shaft 23 shown in FIG. 3. The arrangement of the transmission gearbox of the transaxle is conventional for front wheel drive vehicles. In the preferred embodiment the transaxle transmission unit 22 may be as shown and described in FIG. 4–25 on page 73 of "Automotive Drive Trains" by F. Thiessen and D. Dales, published in 1984 by Reston Publishing Co. Inc. the disclosure of which is incorporated by reference herein.

The output from the gearbox is connected to a transaxle dual differential unit generally indicated at 24. The unit 24 is drivingly connected to left-hand and right-hand front wheel drive or half shafts 25 and 26 respectively. The driveshafts 25,26 are connected at their outer ends to front road wheels 12 through suitable coupling means such as constant-velocity universal joints 27 and homokinetic tripod joints 27' shown, for example, in U.S. Pat. No. 4,372,418 to Dangle issued Feb. 8, 1983.

Figure 3:
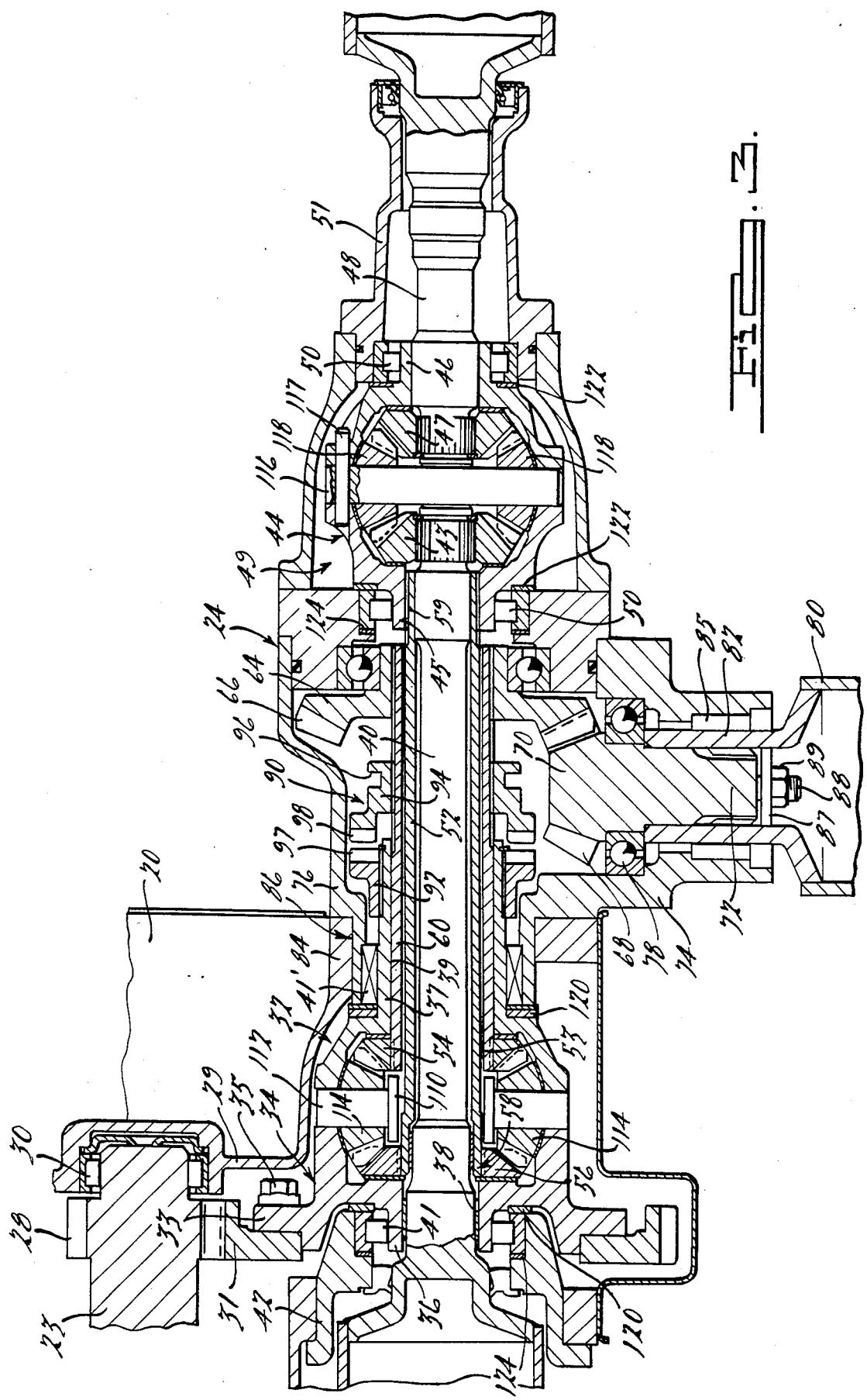
FIG. 3 is a fragmentary vertical sectional view of the dual differential assembly portion of the front transaxle.

As seen in FIG. 3 the transverse output transfer shaft 23 has an output pinion gear 28 positioned adjacent its inboard end. FIG. 3 shows the transfer shaft 23 having its inboard end rotatably journalled in a forwardly extending cup-shaped portion of transaxle housing 29 by roller bearings 30.

In the present invention the transfer shaft output gear 28 meshes with an input ring gear 31 of a first or front-to-rear torque splitting bevel gear interaxle differential 32 of the transaxle unit 22. The ring gear 31 is suitably mounted on a radial flange 33 of a first differential case 34 such as by a plurality of bolts 35. The interaxle differential case 34 has integral oppositely extending outboard 36 and inboard 37 axial extensions. The extensions 36,37 are formed with bores 38 and 39 respectively, aligned on a common transverse axis. The outboard extension 36 has its bore 38 provided with suitable bearings for journalled reception of first side gear shaft 40 therein. The differential casing outboard extension 36 is rotatably supported by constant diameter roller bearings 41 within left front transaxle drive wheel hub 42. The casing inboard extension 37 is rotatably supported by constant diameter roller bearings 41'.

The inboard end of the first side gear shaft 40 is splined in an internal axial bore of inboard bevel side gear 43. The side gear 43 is located in a case 44 of a second or front wheel to front wheel bevel gear differential generally indicated at 49. The case 44 has integral opposite inboard 45 and outboard 46 axial extensions aligned on the axis of the first differential extensions 36 and 37. Outboard bevel side gear 47 of the second differential is splined to the inboard end of a second side gear shaft 48. The first and second side gear shafts 40 and 48 are connected at their outer ends to the front wheel driveshafts 25 and 26 respectively, through suitable coupling means as the constant velocity joints 27'.

It will be noted that the case 44 is a two-part casing joined by a plurality of bolts not shown. The particular arrangement of joining the casing portions is a matter of choice in design. The case could be bolted together, for example, in the manner of the first differential case 34 wherein the bolts are not shown. The second differential outboard extension 46 is rotatably supported by constant diameter roller bearings 50 within transaxle housing 51.

An inner side gear sleeve member 52 is shown in FIG. 3 rotatably mounted in a concentric manner about the first side gear shaft 40. The inner side gear sleeve member 52 has its left-hand end extending into the first differential case 34 through axial bore 53 in an outer sleeve and through inboard bevel side gear 54 for driving connection with outboard beveled side gear 56. As seen in FIG. 3 the inner sleeve member 52 has its left-hand end splined into internal bore 58 of the side gear 56. The inner side gear sleeve 52 has its other or right-hand end drivingly connected to second differential case 44. The inner sleeve 52 has a splined connection with bore 59 of the second differential inboard axial extension 45.

An outer side gear sleeve member 60 is shown in FIG. 3 rotatably mounted in a concentric manner on the inner side gear sleeve member 52 by suitable journal means for relative rotation therewith. The outer sleeve member 60 has its left-hand end journalled in the first differential inboard axial extension bore 39 for driving connection with the side gear 54. In the form shown the outer side gear sleeve 60 has its left-hand end beam welded into the internal bore of the side gear 54. Suitable journal means are also provided for rotatably mounting the inboard axial extension 37 on the outer sleeve member 60 allowing for relative rotation therebetween.

The outer sleeve 60 is seen in FIG. 3 having its inboard or right-hand end connected to a crown or bevel gear 64. The wheel gear 64 has beveled teeth 66 in meshing engagement with the beveled teeth 68 of input rear cone gear 70. The rear drive pinion 70 is shown with a stump trunnion portion 72 journalled within hollow cylindrical extension 74 of the transaxle housing portion 76 by ball bearings 78. A longitudinal front-to-rear propeller drive shaft 80 has a reduced tubular end 82 telescoped over trunnion portion 72. The tubular end 82 is journalled in extension 74 by roller bearings 85 and has a triped housing 87 secured to trunnion portion 72 by threaded bolt 88 and nut 89.

Front transaxle to rear axle lock-out coupling means, indicated generally at 90 in FIG. 3, are provided to selectively connect the input ring gear 31 with the crown gear 64 via differential casing means 34 and outer sleeve 60. In the embodiment shown the lock-out means are provided by a manually operated clutch such as a dogclutch, having a first clutch hub 92 splined to the outer periphery of the first differential axial tubular extension 37. A second clutch hub 94 is splined to the side gear outer sleeve 60 for reciprocal movement thereon along the axis of the transaxle. An annular groove 96 is formed in the hub 94 to receive prongs of a shifting fork (not shown) operable in a conventional manner to slide hub 94 and engage and disengage opposed clutch teeth 97 and 98 of the hubs 92 and 94, respectively.

The cone gear 70 is connected to the propeller shaft 80 by universal joint means indicated at 99 in FIG. 1. The propeller drive shaft 80 is shown in FIG. 1 connected by universal joint means 99' to rear differential means, schematically indicated at 100. The rear differential means, preferably a bevel gear differential, is suitably connected to rear half shaft axles 102 and 104 providing conventional differential action between the two rear road wheels 14.

It will be noted that the interaxle bevel gear differential 32 has a spider ring planetary pinion gear arrangement wherein a spider ring 110 supports a pair of diametrically opposed radial pinion stub shafts 112. Each stub shaft 112 rotatably supports within the casing means 34 a beveled planetary pinion gear 114 which pinion gears mesh at opposite sides with the side gears 54 and 56. The front wheel bevel gear differential 49 has a single continuous pinion gear shaft 116 arranged at right angles to the axis of the case 44. A cross pin 117 is provided to locate the pinion gear shaft 116. The pinion gear shaft 116 rotatably supports a pair of beveled planetary pinion gears 118 within the differential case 44. Each pinion gear 118 meshes at opposite sides with the pair of beveled side gears 43 and 47. It will be noted that needle thrust bearings 120 and 122 are provided for the differential cases 34 and 44 respectively, to absorb the axial thrust loads of the units. Also, suitable shims 124 are provided to axially position the dual differential unit. By virtue of the combination of constant diameter roller bearings 41, and 50 and the needle thrust bearings, the dual differential assembly may be axially aligned relative to the transaxle, by means of shims 124.

In operation, applicant's invention provides a continuous four-wheel drive transaxle for a vehicle having a front transversely mounted engine. When the clutch means 90 is in its disengaged mode, as shown in FIG. 3, the first interaxle bevel gear differential 32 is operative to differentially interconnect the front wheel bevel gear differential 44 and the rear axle differential 100. Upon the clutch means 90 being selectively engaged the transaxle locks-out the interaxle differential 32 to provide a continuous four-wheel drive mode wherein no differentiation occurs between the front transaxle and the rear axle.

While the principles of the invention in connection with the specific apparatus has been described, it is to be understood that the foregoing detailed description has been made by way of example only and not as a limitation to the scope of the invention as set forth in the accompanying claims.

What is claimed is:

1. A dual differential four-wheel drive assembly adapted for a two-wheel drive front transaxle vehicle having an internal combustion engine with a transverse oriented crankshaft for driving the vehicle with front and rear pairs of road wheels, a transmission gear unit for said transaxle including transverse input and output shafts, and right and left laterally extending front axle drive shafts, each drive shaft having front wheel mounting means on its outboard end, said dual differential assembly comprising; housing means having a laterally extending passage therethrough aligned on a transverse axis, said housing means having first and second differential casings for associated first and second bevel gear differentials, said casings supported in laterally spaced alignment for rotation about said transverse axis, each said first and second differential casing enclosing inboard and outboard side gears in meshing relation with a plurality of planetary pinion gears, each said casing having opposed inboard and outboard axial extensions thereon, each casing extension formed with a through bore aligned on said transverse axis, input gear means on said first casing engaging gear means on said transmission output shaft, first and second side gear shafts aligned on said transverse axis, said first side gear shaft inboard end extending through the bores of said first casing extensions and said second casing inboard extension end connected to said second differential inboard side gear for rotation therewith, said second side gear shaft inboard end extending through said second casing outboard extension bore and connected to said second differential outboard side gear for rotation therewith, an inner constant diameter sleeve concentric about said first side gear shaft having its one end connected to said first differential outboard side gear for rotation therewith and its other end fixed to said second casing for rotation therewith, an outer constant diameter sleeve concentric about said inner sleeve and having one end connected to said first casing for rotation therewith, said outer sleeve having a driving crown gear fixed to its other end for rotation therewith, a longitudinally extending propeller shaft having a drive cone gear fixed to its forward end in meshed engagement with said driving crown gear, said propeller shaft having its aft end drivingly engaged with a third rear wheel differential, rear axle means interconnecting said pair of rear road wheels to said rear wheel differential, clutch means adapted to selectively provide torque transfer between said first casing and said outer sleeve, said clutch means in the form of a first clutch hub splined on said first differential inboard axial extension, said clutch means having a second clutch hub slidably splined on said outer sleeve for reciprocal movement thereon between said first clutch hub and said driving crown gear, engaging teeth on each said clutch hub in opposed facing relation and operative to be engaged and disengaged upon axial movement of said second clutch hub on said outer sleeve, whereby said dual differential assembly providing a continuous four-wheel drive mode with said first differential operative to differentially interconnect said second and third differentials when said second clutch hub teeth are disengaged from said first clutch hub teeth, and wherein said assembly providing a continuous four-wheel drive mode without differentiation between said front transaxle and said rear axle means when said second clutch hub teeth are engaged with said first clutch hub teeth.

2. The dual differential assembly as set forth in claim 1, wherein each said first casing outboard extension and said second outboard and inboard extensions are rotatably supported in said transaxle by means of a combination of constant diameter roller bearings and needle thrust bearings, such that said dual differential assembly is axially aligned to said transaxle by shim means.

* * * * *